(12) United States Patent
Han et al.

(10) Patent No.: US 7,609,478 B2
(45) Date of Patent: Oct. 27, 2009

(54) MAGNETIC WRITER POLE WITH A GRADED MAGNETIC MOMENT

(75) Inventors: Dehua Han, Eden Prairie, MN (US); Xuefei Tang, Eden Prairie, MN (US); Christopher James Thompson Rea, Edina, MN (US); Jianhua Xue, Maple Grove, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 592 days.

(21) Appl. No.: 11/390,681

(22) Filed: Mar. 28, 2006

(65) Prior Publication Data

US 2007/0230044 A1 Oct. 4, 2007

(51) Int. Cl.
*G11B 5/31* (2006.01)
*G11B 5/127* (2006.01)

(52) U.S. Cl. .............................. 360/125.12; 360/125.13
(58) Field of Classification Search .................. 360/122, 360/125.01–125.03, 125.08, 125.12, 125.13
See application file for complete search history.

(56) References Cited

U.S. PATENT DOCUMENTS

| | | | |
|---|---|---|---|
| 5,495,379 A | 2/1996 | McNeil et al. | |
| 5,995,341 A | 11/1999 | Tanaka et al. | |
| 6,504,675 B1 | 1/2003 | Shukh et al. | |
| 6,771,464 B2 | 8/2004 | Minor | |
| 6,778,357 B2 | 8/2004 | Tabakovic et al. | |
| 6,791,796 B2 | 9/2004 | Shukh et al. | |
| 6,809,899 B1 | 10/2004 | Chen et al. | |
| 6,822,829 B2 * | 11/2004 | Minor et al. | 360/125.12 |
| 7,057,853 B2 * | 6/2006 | Okada et al. | 360/125.12 |
| 7,133,252 B2 * | 11/2006 | Takano et al. | 360/125.13 |
| 7,221,538 B2 * | 5/2007 | Kawato et al. | 360/125.04 |
| 7,280,314 B2 * | 10/2007 | Gill et al. | 360/125.12 |
| 7,372,664 B1 * | 5/2008 | Mallary et al. | 360/123.02 |
| 7,382,574 B2 * | 6/2008 | Li et al. | 360/125.08 |
| 7,443,633 B2 * | 10/2008 | Tagami et al. | 360/125.5 |
| 2003/0133223 A1 * | 7/2003 | Minor | 360/125 |
| 2004/0004786 A1 * | 1/2004 | Shukh et al. | 360/126 |
| 2004/0120074 A1 * | 6/2004 | Okada et al. | 360/126 |
| 2004/0252415 A1 * | 12/2004 | Shukh et al. | 360/317 |
| 2005/0068665 A1 | 3/2005 | Le et al. | |
| 2006/0044680 A1 * | 3/2006 | Liu et al. | 360/126 |

FOREIGN PATENT DOCUMENTS

| | | | |
|---|---|---|---|
| GB | 2003647 A * | 3/1979 | |
| JP | 61117714 A * | 6/1986 | |
| JP | 2000055995 A | 2/2000 | |
| JP | 2000090413 A | 3/2000 | |
| WO | WO 8905505 A1 * | 6/1989 | |

OTHER PUBLICATIONS

English-translation of Otsubo et al. (JP 61-117714), published in Japanese on Jun. 5, 1986.*

* cited by examiner

*Primary Examiner*—William J Klimowicz
(74) *Attorney, Agent, or Firm*—Kinney & Lange P.A.

(57) ABSTRACT

A magnetic writer includes a write pole configured to reduce a skew effect during writing to a magnetic medium. A trailing portion of the write pole has a magnetic moment greater than a leading portion of the write pole.

12 Claims, 5 Drawing Sheets

MAGNETIC WRITER POLE WITH A GRADED MAGNETIC MOMENT

BACKGROUND OF THE INVENTION

The present invention relates to magnetic writers. More particularly, the present invention relates to a perpendicular magnetic writer including a write pole having a graded magnetic moment.

The writer portion of a perpendicular recording head typically consists of a main pole and a return pole, which are separated from each other at an air bearing surface of the writer by a gap layer. The main pole and return pole are connected to each other at a region distal from the air bearing surface by a back gap closer or back via. One or more layers of conductive coils are positioned between the main and return poles, and are encapsulated by insulating layers.

To write data to the magnetic media, an electric current is applied to the conductive coils to induce a magnetic field in the media under the main pole. By reversing the direction of the current through the coils, the polarity of the data written to the magnetic media is reversed, and a magnetic transition is written between two adjacent bits. Because the main pole is generally the trailing pole of the main and return poles, the main pole is used to write the data to the magnetic media. Accordingly, it is the main pole that defines the track width of the written data. More specifically, the track width is defined by the width of the main pole at the air bearing surface.

In perpendicular recording heads, magnetization transitions are recorded on the magnetic medium by a trailing edge of the main pole. The shape of the main pole is projected and reproduced on the magnetic medium during the write process. However, unwanted side writing may occur due to the change in skew angle as the recording head travels in an arc across the magnetic medium. This can cause adjacent track interference, resulting in off track erasure of transitions recorded on the magnetic medium. With increasing write pole height, the effect of the skew angle on the write pole is more pronounced, which results in a reduction of the track density on the magnetic medium.

BRIEF SUMMARY OF THE INVENTION

The present invention is a magnetic writer including a write pole configured to reduce a skew effect during writing to a magnetic medium. A trailing portion of the write pole has a magnetic moment greater than a leading portion of the write pole.

DETAILED DESCRIPTION

Figure 1:
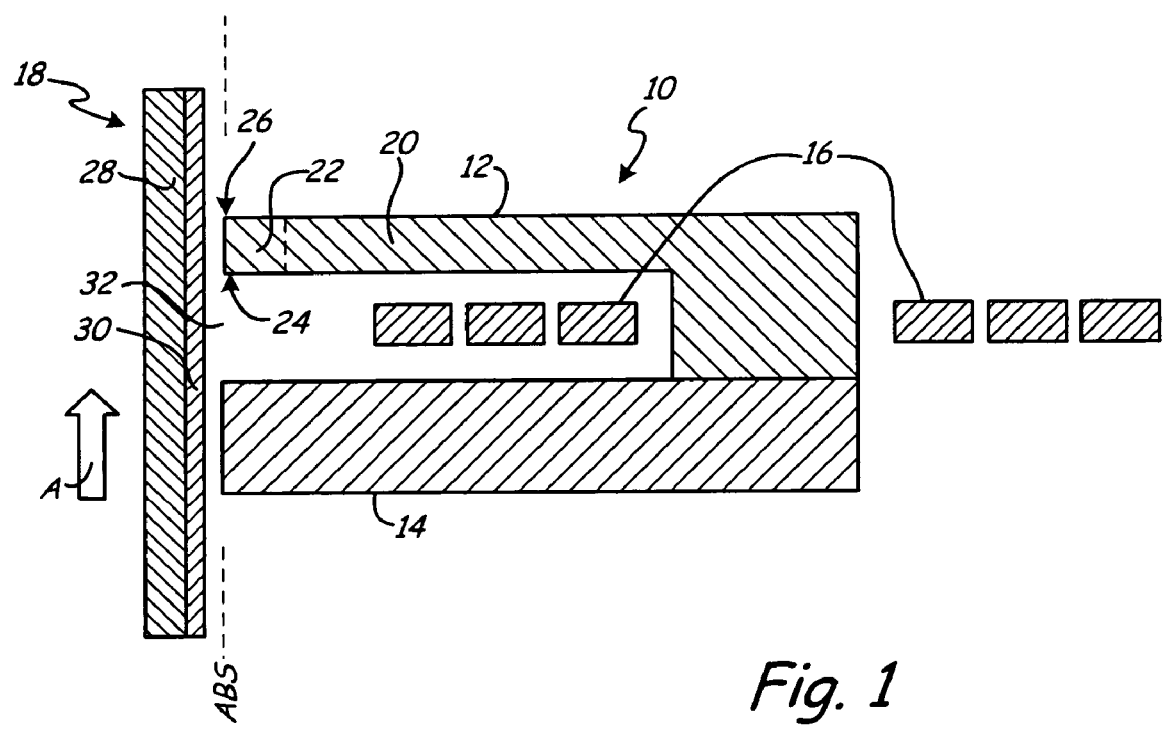
FIG. 1 is a cross-sectional view of a perpendicular magnetic recording head.

FIG. 1 is a cross-sectional view of a perpendicular writer 10. Perpendicular writer 10 includes main pole 12, return pole 14, and magnetization coils 16. Conductive coil 16 surrounds a yoke portion of main pole 12 that magnetically couples main pole 12 to return pole 14. Perpendicular writer 10 confronts magnetic medium 18 at an air bearing surface (ABS) of main pole 12 and return pole 14. Main pole 12 includes main pole body 20 and main pole tip 22. Main pole tip 22 has a leading edge 24 and a trailing edge 26. Magnetic medium 18 includes magnetically soft underlayer 28 and magnetically hard recording layer 30. It should be noted that the configuration for perpendicular writer 10 is merely illustrative, and many other configurations may alternatively be employed in accordance with the present invention.

Magnetic medium 18 travels or rotates in a direction relative to perpendicular writer 10 as indicated by arrow A. To write data to magnetic medium 18, an electric current is caused to flow through conductive coil 16, which passes through write gap 32 between main pole 12 and return pole 14. This induces a magnetic field across write gap 32. By reversing the direction of the current through conductive coil 16, the polarity of the data written to magnetic medium 18 is reversed. Because main pole 12 operates as the trailing pole, main pole 12 is used to physically write the data to magnetic medium 18. Accordingly, it is main pole 12 that defines the track width of the written data. More specifically, the track width is defined by the width of trailing edge 26 of main pole 12 at the ABS.

Figure 2A:
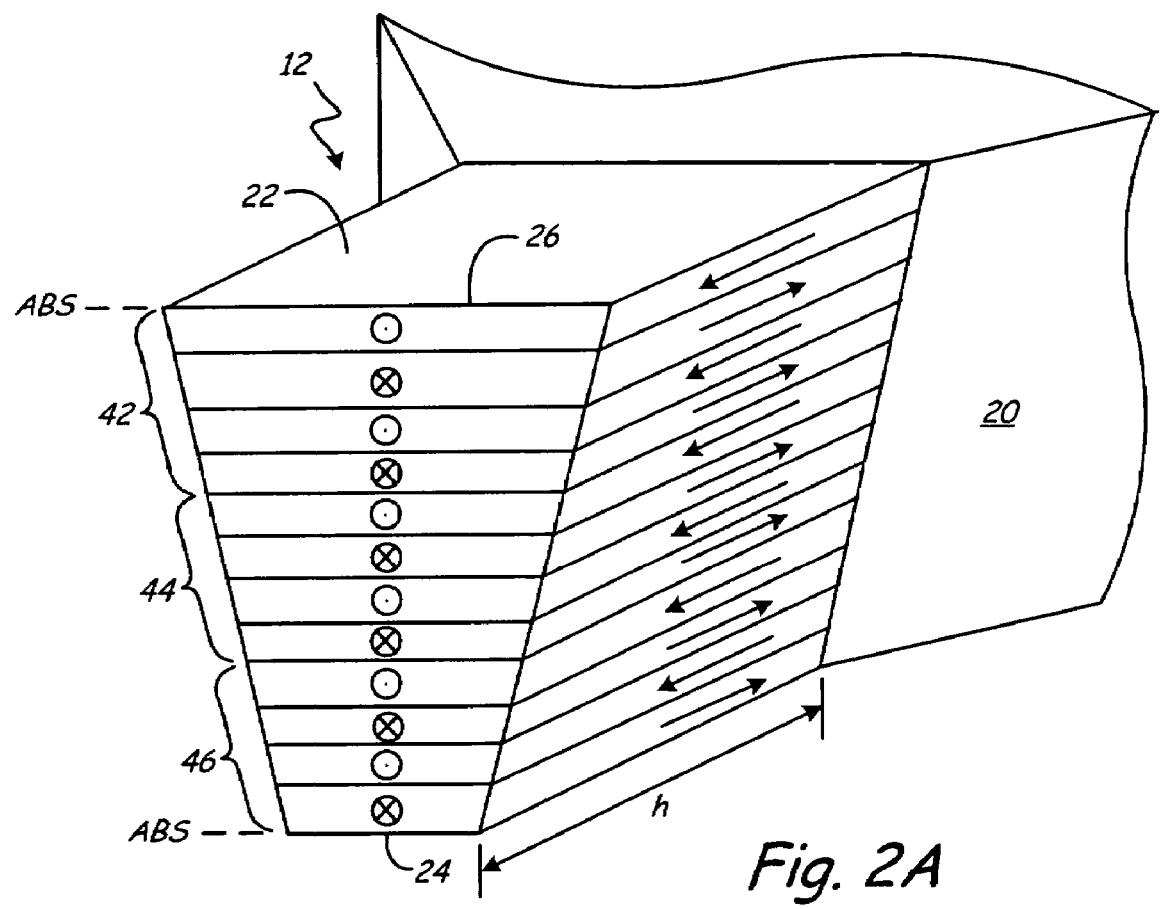
FIG. 2A is a perspective view of a main pole including a laminated main pole tip having a graded magnetic moment.
Figure 2C:
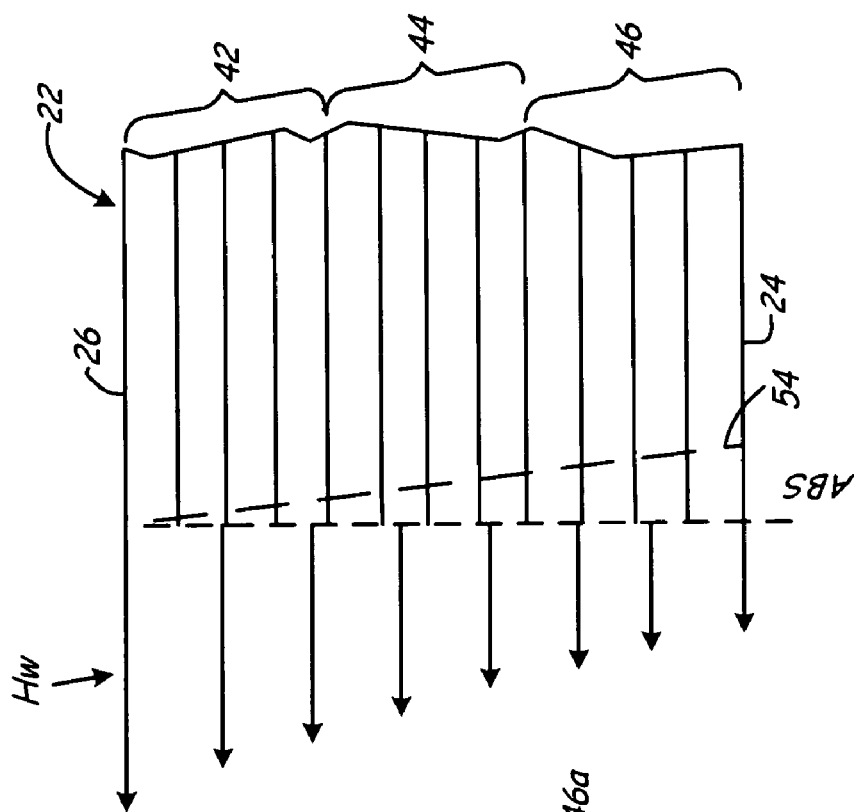
FIG. 2C is a side view of the main pole tip shown in FIG. 2A.
Figure 2B:
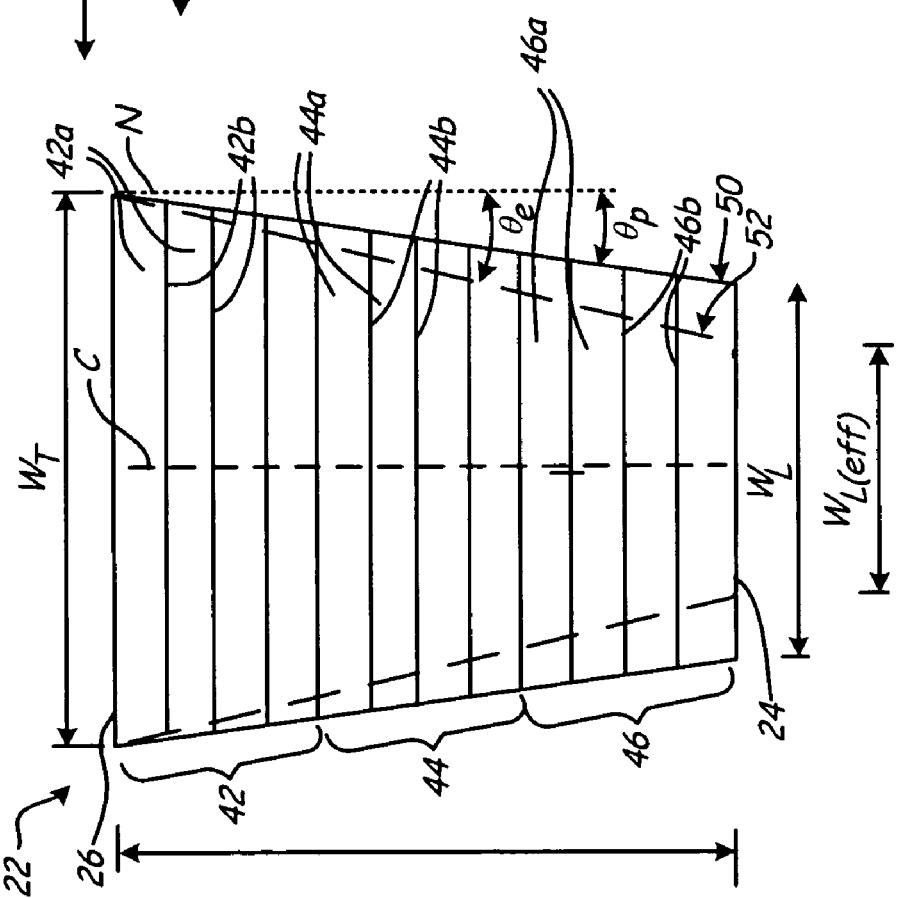
FIG. 2B is an air bearing surface (ABS) view of the main pole tip shown in FIG. 2A.

FIG. 2A is a perspective view, FIG. 2B is an ABS view, and FIG. 2C is a side view of main pole tip 22 according to the present invention. Main pole tip 22 includes first portion 42, second portion 44, and third portion 46. First portion 42, second portion 44, and third portion 46 define physical wall 50, which forms an angle $\theta_p$ with a normal N to trailing edge 26. Angle $\theta_p$ may be in the range of about 0° to about 20°. First portion 42 defines trailing edge 26 having width $w_T$, and third portion 46 defines leading edge 24 having width $w_L$.

First portion 42 includes alternately laminated magnetic layers 42a and nonmagnetic layers 42b, second portion 44 includes alternately laminated magnetic layers 44a and nonmagnetic layers 44b, and third portion 46 includes alternately laminated magnetic layers 46a and nonmagnetic layers 46b. The nonmagnetic layers decouple the adjacent magnetic layers. The shape anisotropy due to the break point height h of main pole tip 22 causes the easy axes of magnetization of magnetic layers 42a, 44a, and 46a to align perpendicular to the ABS. In one embodiment, the magnetizations of adjacent magnetic layers are oriented antiparallel with respect to each other (as shown in FIG. 2A). By decoupling adjacent magnetic layers in main pole tip 22, fringing magnetic flux, which can be strong enough to partially or completely erase information recorded on the same or adjacent tracks of magnetic medium 18, is eliminated or substantially reduced.

Main pole tip 22 has a graded magnetic moment at the air bearing surface such that the magnetic moment at leading edge 24 is less than the magnetic moment at trailing edge 26. Magnetic layers 42a have a magnetic moment greater than magnetic layers 44a, and magnetic layers 44a have a magnetic moment greater than magnetic layers 46a. In one embodiment, the magnetic moment of first portion 42 is greater than about 2.0 T, the magnetic moment of second portion 44 is in the range of about 1.4 T to about 2.2 T, and the magnetic moment of third portion 46 is less than about 1.5 T. Any suitable magnetic and nonmagnetic layers may be used for the alternating layers. Example materials that may be used for magnetic layers 42a, 44a, and 46a include CoFe, CoFeNi, CoFeV, CoFeMn, CoFeCr, CoFeN, CoFePt, CoFeRh, CoNiFeN, NiFe (e.g., $Ni_{80}Fe_{20}$, $Ni_{45}Fe_{55}$, etc.), NiFeN, NiFeCr, FeN, FeAlN, FeAlSi, FeTaN, CoZr, CoZrNb, CoZn, CoNbZn, or similar materials. In one embodiment, magnetic layers 42a comprise $Co_xFe_y$ (where x≅20-45% and y≅55-80%) or $Co_uFe_vX_w$ (where X is Pt or Rh, u≅15-35%, v≅50-80%, and w≅5-15%), magnetic layers 44a comprise $Co_xFe_yNi_z$ (where x=15-55%, y=10-80%, and z=5-35%), and magnetic layers 46a comprise $Ni_xFe_y$ (where x=55-95% and y=5-45%). Example materials that may be used for nonmagnetic layers 42b, 44b, and 46b include $Al_2O_3$, $SiO_2$, NiCr, Ru, Cr, Ta and oxides thereof, Ti and oxides thereof, and W and oxides thereof. The thicknesses of the magnetic and nonmagnetic layers of main pole tip 22 depend on the areal recording density of the perpendicular writer 10 and the number of layers in main pole 12.

It should be noted that while three portions having different magnetic moments are shown in FIGS. 2A-2C, main pole tip 22 may include any number of portions as long as the magnetic moment of main pole tip 22 increases from leading edge 24 to trailing edge 26. For example, each magnetic layer of main pole tip 22 may have a different magnetic moment, such that the magnetic layer that defines leading edge 24 has the lowest magnetic moment, the magnetic layer that defines trailing edge 26 has the highest magnetic moment, and the intermediate magnetic layers have increasing magnetic moments from leading edge 24 to trailing edge 26. In addition, while twelve magnetic layers are shown, main pole tip 22 may include any number of magnetic and nonmagnetic layers (and each portion may include any number of magnetic and nonmagnetic layer) as long as the overall length l of main pole tip 22 remains within design specifications. The following table lists some example configurations for main pole tip 22 including two and three portions, wherein the highest moment magnetic material is at trailing edge 26 and the lowest moment magnetic material is at leading edge 24. The three columns at the right list the number of magnetic layers (i.e., repeats) and thickness of the magnetic layers in the corresponding portion.

| Configuration | Break Point Height h (nm) | Repeats/Layer thickness (Å) | | |
|---|---|---|---|---|
| | | 2.4 T FeCo | 2.1 T FeCoNi | 1.0 T NiFe |
| 1 | 200 | 4/225 | 2/225 | 2/225 |
| 2 | 300 | 4/225 | 4/225 | 4/225 |
| 3 | 300 | 4/225 | 6/225 | 2/225 |
| 4 | 300 | 4/225 | 2/225 | 6/225 |
| 5 | 250 | 4/225 | 3/225 | 3/225 |
| 6 | 250 | 4/225 | 4/225 | 2/225 |
| 7 | 200 | 4/225 | 4/225 | N/A |
| 8 | 200 | 4/225 | N/A | 4/225 |
| 9 | 200 | 6/225 | N/A | 2/225 |
| 10 | 250 | 4/225 | 2/225 | 4/225 |
| 11 | 250 | 6/225 | N/A | 4/225 |
| 12 | 200 | 4/225 | 1/1000 | N/A |
| 13 | 200 | 4/225 | N/A | 1/1000 |
| 14 | 250 | 4/225 | 2/340 | 2/340 |
| 15 | 250 | 6/225 | N/A | 1/1000 |
| 16 | 250 | 6/225 | 1/1000 | N/A |
| 17 | 250 | 6/225 | 2/225 | 2/225 |
| 18 | 250 | 8/225 | N/A | 2/225 |

As shown in FIG. 2B, because the magnetic moment of main pole tip 22 is graded from the leading edge 24 to trailing edge 26, an effective magnetic wall 52 forms having an effective wall angle $\theta_e$ with normal N to trailing edge 26. The effective wall angle $\theta_e$ is greater than the physical wall angle $\theta_p$. In one embodiment, the effective wall angle $\theta_e$ is about 3° to 4° greater than the physical wall angle $\theta_p$. Also, as shown in FIG. 2C, the graded magnetic moment of main pole tip 22 results in an effective write field $H_w$ at the ABS of main pole tip 22 having an increasing magnitude from leading edge 24 to trailing edge 26. Consequently, while the physical ABS of main pole tip 22 is substantially parallel to magnetic medium 18, the effective ABS 54 of main pole tip 22 is recessed at leading edge 24. The configuration of main pole tip 22 reduces side track erasure since the low moment of leading edge 24 becomes saturated before the high moment of trailing edge 26. In addition, the high frequency permeability of main pole tip 22 is up to 25% higher than a main pole tip laminated with magnetic layers having a single magnetic moment. This reduces the flux leakage of main pole 12, which increases the efficiency of perpendicular writer 10. The following table shows Leading edge 24, trailing edge 26, and effective magnetic walls 52 form a substantially trapezoidal shape at the ABS. The substantially trapezoidal effective shape at the ABS decreases the dependence of the track width recorded by main pole 12 on the skew angle of perpendicular writer 10. This improves the recording density of perpendicular writer 10 and reduces the bit error rate and side writing and erasure on adjacent tracks of magnetic medium 18. In one embodiment, the magnetic moments of portions 42, 44, and 46 are selected to produce an effective wall angle $\theta_e$ equal to or greater than the maximum skew angle of perpendicular writer 10. Because the moments of the magnetic layers in main pole tip 22 result in an increase in the effective wall angle $\theta_e$, physical wall angle $\theta_p$ may be as small as 0° (which maximizes flux through main pole tip 30) to provide a trapezoidal effective shape at the ABS (which compensates for the skew effect).

In addition, with increased recording densities, the length l and width $w_T$ of main pole tip 22 decrease to write narrower transitions on magnetic medium 18. As the dimensions of main pole tip 22 decrease, width $w_L$ of leading edge 24 also decreases to provide a configuration for main pole tip 22 that compensates for the skew effect. At high skew angles, the physical shape of main pole tip 22 approaches a triangular shape. However, fabrication of main pole 12 including main pole tip 22 having a triangular shape is difficult because the narrow dimensions make perpendicular writer 10 subject to damage. In the present invention, the effective magnetic wall 52 may be controlled (i.e., the magnetic moments of portions 42, 44, and 46 may be selected) to produce a triangular effective shape at the ABS, while the physical shape of main pole tip 22 sustains a more stable trapezoidal physical shape at the ABS. In other words, the effective width $w_{L(eff)}$ of leading edge 24 approaches zero, while the physical width $w_L$ is non-zero.

The fabrication of main pole tip 22 is also easier than fabrication of a similar main pole tip including magnetic layers having the same magnetic moment because the low moment materials proximate to leading edge 24 are softer than the high moment materials proximate to trailing edge 26. Consequently, milling or etching of main pole tip 22 into the desired trapezoid shape is easier than if main pole tip were made of a single type of material. This allows the physical wall angle physical wall angle $\theta_p$ to be larger compared to a main pole tip comprising a single magnetic moment material. In one embodiment, the larger physical wall angle $\theta_p$ results in an effective wall angle θ$_e$ of about 6° to 7° greater than the physical wall angle of a main pole tip comprising a single magnetic moment material.

Figure 3:
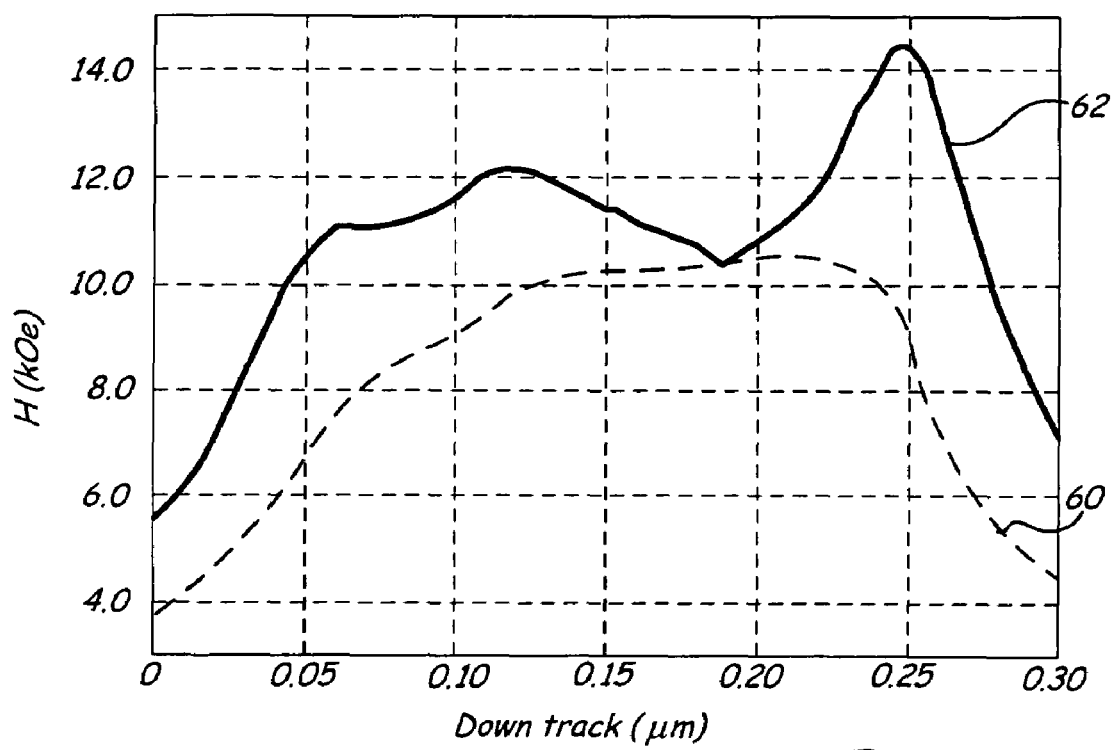
FIG. 3 is a graph showing a perpendicular component of the write field and an effective write field versus the down track position of the main pole tip having a graded magnetic moment.

FIG. 3 is a graph showing the write field as a function of the down track position of main pole tip 22 taken along center line C in FIG. 2B. Leading edge 24 is at a down track position of 0.05 μm, and trailing edge 26 is at a down track position of 0.25 μm (i.e., length l of main pole tip 22 is approximately 200 nm). A write current of approximately 40 mA 0-to-peak was applied to conductive coils 16. Line 60 shows the perpendicular component of the write field H$_y$ at approximately 0.02 μm from the ABS of main pole tip 22. Line 62 shows the effective write field H$_{eff}$ at approximately 0.02 μm from the ABS, which includes the effect of all components of the write field and the easy axis magnetization direction of magnetic medium 18. As is shown, both of the fields are stronger at trailing edge 26 than at leading edge 24, indicating that a structure that is functionally equivalent to a main pole with a yoke recess may be obtained in a thick graded moment pole. This can largely reduce fabrication and processing requirements. In addition, the effective write field H$_{eff}$ at trailing edge 26 is large enough to write transitions to the highly coercive hard magnetic layer 30 of magnetic medium 18. Furthermore, compared to a laminated main pole including magnetic layers having a single magnetic moment, the write field gradient of main pole 12 improved by more than 11% at trailing edge 26.

Figure 4:
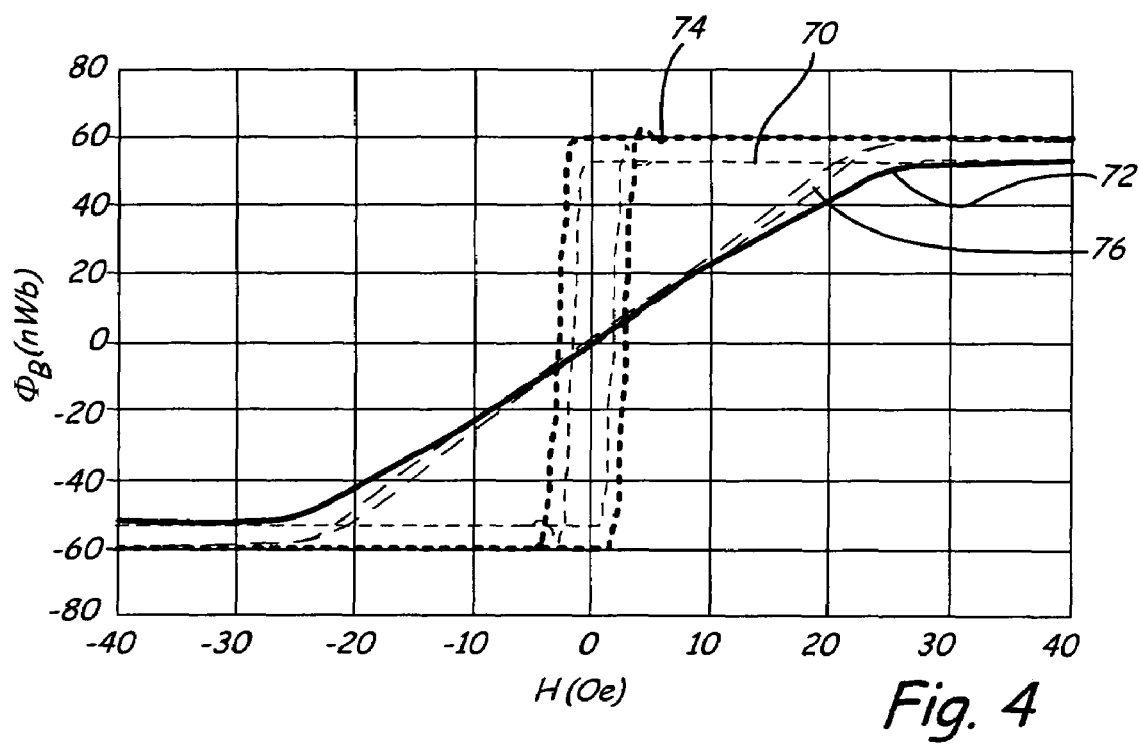
FIG. 4 is a graph of B-H loops along the easy and hard axes of magnetization for a write pole including the main pole tip having a graded magnetic moment and for a write pole including a main pole tip having a single magnetic moment.

FIG. 4 is a graph of B-H loops for laminated main pole 12 having a graded magnetic moment and for a laminated write pole including a magnetic layers having a single magnetic moment. In particular, line 70 is a B-H loop measured along the easy axis of magnetization of main pole tip 22, and line 72 is a B-H loop measured along the hard axis of magnetization of main pole tip 22. Lines 74 and 76 are B-H loops measured along the easy and hard axes of magnetization, respectively, for a main pole including magnetic layers having a single magnetic moment. For both main poles tested, the decoupling nonmagnetic layers between the magnetic layers were made of Al$_2$O$_3$, and the length l of each main pole was 200 nm. The main poles were tested after annealing at 225° C. for two hours in a 2 kOe magnetic field.

As is shown by lines 74 and 76, the coercivity (i.e., where the magnetic flux Φ$_B$ is zero) and the remnant flux (i.e., where the write field H is zero) are lower for main pole 12 than for a laminated main pole with magnetic layers having a single magnetic moment. Consequently, the write current required to orient the domains of main pole tip 22 for the write operation is less than that required for the laminated main pole with magnetic layers having a single magnetic moment. In addition, the anisotropy field (i.e., where a line tangent to the hard axis B-H loop crosses the easy axis B-H loop) for main pole 12 is greater than the anisotropy field for the laminated main pole with magnetic layers having a single magnetic moment. This results in better domain control and more efficient operation of perpendicular writer 10. In the devices tested for the graph of FIG. 4, the anisotropy field for main pole 12 was about 25.7 Oe, while the anisotropy field for the single moment laminated main pole was about 21.5 Oe.

In summary, the present invention is a magnetic writer including a write pole configured to reduce a skew effect during writing to a magnetic medium. A trailing portion of the write pole has a magnetic moment greater than a leading portion of the write pole. To reduce the skew effect during writing, the write pole may include a leading edge with a first width and a trailing edge with a second width greater than the first width. By grading the magnetic moment of the write pole from the leading edge to the trailing edge, off-track erasure (e.g., side writing and erasing) is prevented. In addition, the write pole includes a multilayer or laminated structure to prevent on-track erasure after writing.

Although the present invention has been described with reference to preferred embodiments, workers skilled in the art will recognize that changes may be made in form and detail without departing from the spirit and scope of the invention.

The invention claimed is:

1. A magnetic writer comprising a multilayer write pole configured to reduce a skew effect during writing to a magnetic medium, the write pole comprising alternating magnetic and nonmagnetic layers, wherein magnetization directions of adjacent magnetic layers of the write pole are antiparallel and each of the magnetic layers of the write pole has a different magnetic moment, the magnetic layers having increasing magnetic moments from a leading edge of the write pole to a trailing edge of the write pole, such that a trailing portion of the write pole has a magnetic moment greater than a leading portion of the write pole and an intermediate portion of the write pole between the trailing portion and the leading portion has a magnetic moment greater than the leading portion and less than the trailing portion.

2. The magnetic writer of claim 1, wherein a trailing edge of the write pole is wider than a leading edge of the write pole.

3. The magnetic writer of claim 2, wherein the leading edge and the trailing edge define a physical wall angle in the range of about 0° to about 20°.

4. The magnetic writer of claim 3, wherein an effective wall angle of the write pole is greater than the physical wall angle of the write pole.

5. The magnetic writer of claim 1, wherein the write pole has a substantially trapezoidal cross-section.

6. The magnetic writer of claim 1, wherein each of the leading portion and the trailing portion of the write pole comprises four magnetic layers alternating with nonmagnetic layers.

7. A multilayer write pole comprising:
   a leading portion comprising alternating magnetic and nonmagnetic layers, the leading portion having a leading edge with a first magnetic moment and a first width;
   a trailing portion comprising alternating magnetic and nonmagnetic layers, the trailing portion having a trailing edge with a second magnetic moment greater than the first magnetic moment and a second width greater than the first width; and
   an intermediate portion between the leading portion and the trailing portion, the intermediate portion having a third magnetic moment greater than the first magnetic moment and less than the second magnetic moment;
   wherein magnetization directions of adjacent magnetic layers of the multilayer write pole are antiparallel and each of the magnetic layers has a different magnetic moment, such that the magnetic layers have increasing magnetic moments from the leading edge to the trailing edge of the multilayer write pole.

8. The multilayer write pole of claim 7, wherein the leading edge and the trailing edge of the multilayer write pole define a physical wall angle in the range of about 0° to about 20°.

9. The multilayer write pole of claim 8, wherein an effective wall angle of the multilayer write pole is greater than the physical wall angle of the multilayer write pole.

10. The multilayer write pole of claim 7, wherein each of the leading portion and the trailing portion comprises four magnetic layers alternating with nonmagnetic layers.

11. The multilayer write pole of claim 10, wherein the intermediate portion comprises four magnetic layers alternating with nonmagnetic layers.

12. A perpendicular magnetic writer comprising a main pole including a main pole tip having a substantially trapezoidal effective cross-section, wherein the main pole tip is a multilayer structure comprising alternating layers of magnetic and nonmagnetic materials and having a trailing region, a leading region, and an intermediate region between the trailing region and the leading region, wherein magnetization directions of adjacent layers of the magnetic materials in the main pole tip are antiparallel and each of the layers of the magnetic materials in the main pole tip has a different magnetic moment, the layers of the magnetic materials having increasing magnetic moments from a leading edge of the main pole tip to a trailing edge of the main pole tip, such that the trailing region of the main pole tip has a greater magnetic moment than the leading region of the main pole tip and wherein the intermediate region of the main pole tip has a lesser magnetic moment than the trailing region of the main pole tip and a greater magnetic moment than the leading region of the main pole tip; wherein the leading edge and the trailing edge of the main pole tip define a physical wall angle in the range of about 0° to about 20° and an effective wall angle of the main pole tip is greater than the physical wall angle of the main pole tip.

* * * * *

UNITED STATES PATENT AND TRADEMARK OFFICE
CERTIFICATE OF CORRECTION

PATENT NO. : 7,609,478 B2
APPLICATION NO. : 11/390681
DATED : October 27, 2009
INVENTOR(S) : Han et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 805 days.

Signed and Sealed this

Twelfth Day of October, 2010

David J. Kappos
*Director of the United States Patent and Trademark Office*